(No Model.)
J. S. PATTEN.
VEGETABLE CUTTER.
No. 466,183. Patented Dec. 29, 1891.
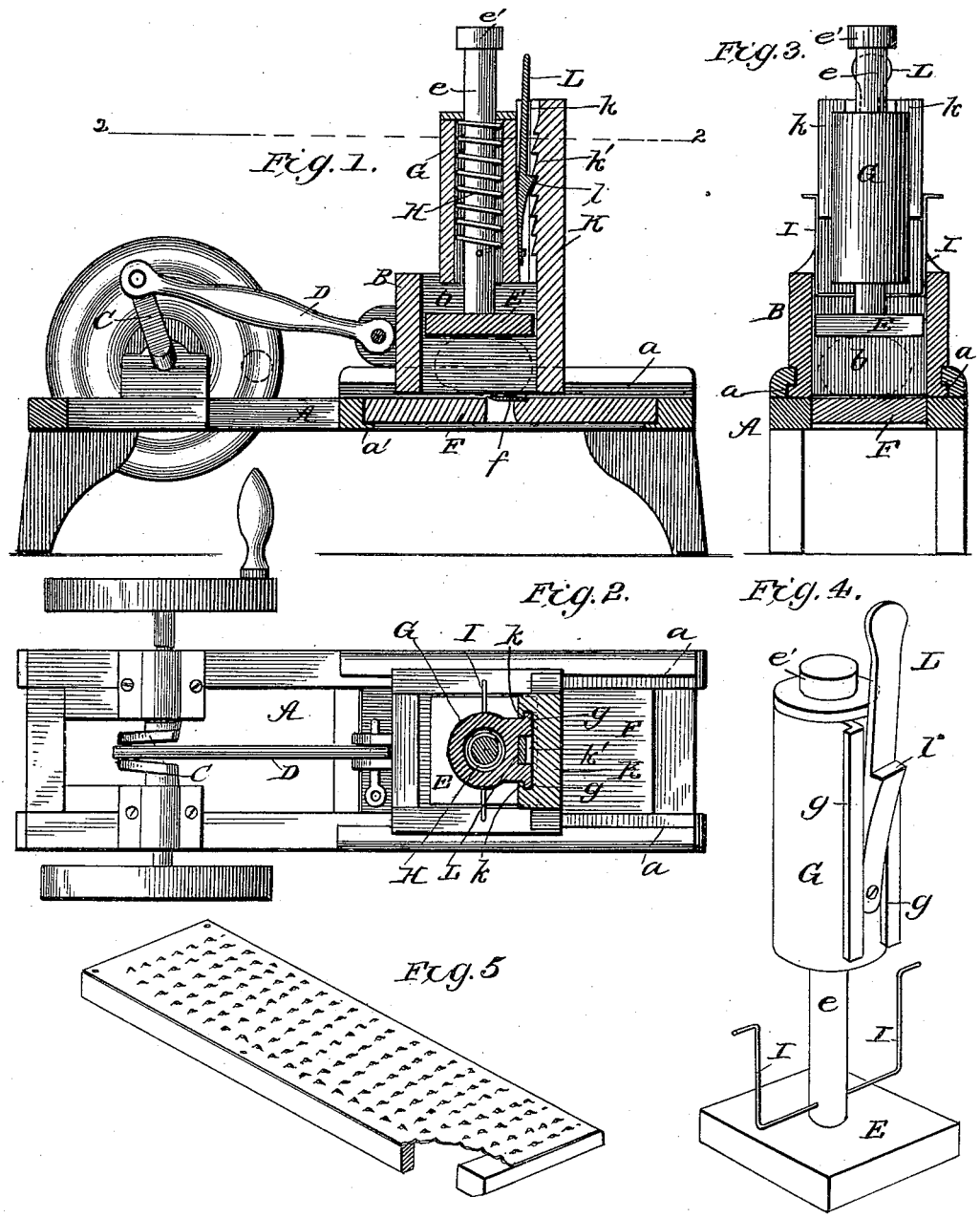
WITNESSES:
Fred G. Dieterich
Amos W. Hart
INVENTOR:
James S. Patten.
BY
ATTORNEYS

UNITED STATES PATENT OFFICE.

JAMES S. PATTEN, OF BALTIMORE, MARYLAND.

VEGETABLE-CUTTER.

SPECIFICATION forming part of Letters Patent No. 466,183, dated December 29, 1891.

Application filed May 29, 1891. Serial No. 394,597. (No model.)

*To all whom it may concern:*

Be it known that I, JAMES S. PATTEN, of the city of Baltimore, in the State of Maryland, have invented a new and useful Improvement in Vegetable-Cutters, of which the following is a specification.

My invention is an improvement in that class of vegetable and fruit cutters or slicers in which the vegetable or fruit is carried by a reciprocating holder operated by a crank and arranged to work on a bed or table provided with a cutter.

My invention pertains to certain improvements in the fruit-holder proper.

In accompanying drawings, Figure 1 is a longitudinal section of the machine. Fig. 2 is mainly a plan view, a portion being in section on line 2 2 of Fig. 1. Fig. 3 is a vertical cross-section. Fig. 4 is a perspective view of the follower and its guide and certain attachments of the same. Fig. 5 is a perspective view of a grater that is adapted for employment in the machine.

The horizontal frame A is provided with ways or guides $a$ $a$, in which the fruit-holder B is reciprocated by means of the crank C and pitman D. The fruit-holder B consists of a box open at top and bottom and a spring-actuated follower E, adapted to work vertically therein and serving to press the vegetables or fruits down upon the bed F, to which the cutter $f$ is secured. The follower stem or rod $e$ works in a vertical cylindrical guide G, and is encircled by a helical spring H, whose lower end is attached to said stem $e$, while its upper end bears against the head of the guide G. The upper end of the follower-stem is provided with a head $e'$ to limit the downward movement of the follower E relative to the guide G.

In order to prevent contact of the follower with the cutter $f$, I provide a stop I, which consists of one or two wire arms attached to the stem $e$ and bent laterally to adapt them to rest on the upper edge of the box.

The follower E and its cylindrical guide G are detachably and adjustably connected with the vegetable and fruit holding box by the following means: The said box is provided with a vertical post K, having inwardly-projecting flanges $k$, between which is a ratch $k'$. The follower-guide G has vertically-parallel lateral flanges $g$, that are adapted to fit and slide in the grooves formed by the flanges $k$ of post K, and a spring-catch L is arranged between the said flanges of guide G and adapted for engagement with the ratch $k'$ on the post K. The catch L is a metal plate-spring having a square shoulder $l$, and held normally engaged with the corresponding shoulders of the ratch $k'$, while its upper end projects above the guide G, so it is conveniently accessible. It will be seen that by pressing such projecting end of the catch L toward the guide G the latter and the follower E may be raised and removed altogether, as required, to enable vegetables or fruits to be placed in the box B, and when said parts are replaced the follower-catch automatically reengages the ratch. By pressing down on the guide G the catch L will slide over the ratch $k'$, and thus the spring H may be further compressed, so as to cause the follower E to bear with increased pressure on the vegetable or fruit being sliced.

The slotted bed F on which the cutter $f$ is secured is held in a recess in the frame A and supported by horizontal flanges $a'$, as shown in Fig. 1. The said bed F, with the cutter, is thus adapted to be readily removed when desired.

The grater shown in Fig. 5 has an oblong rectangular frame similar to the knife-bed F, and is thereby adapted to be inserted in place of the latter when it is desired to grate instead of slice a fruit or vegetable. In other words, the knife-bed is taken out and the grater put in, or vice versa, according to the work to be done.

What I claim is—

1. In a vegetable and fruit cutter, the combination, with the box B, having the vertical post provided with guides and a ratch, of the follower, the spring encircling its stem, a guide in which the said stem and spring are held, flanges formed on such guide, and a spring-catch adapted to engage the aforesaid ratch, as shown and described, whereby the follower and its guide may be pressed down or raised and removed, as required, substantially as shown and described.

2. In a vegetable and fruit cutter, the combination, with the box B, having the vertical post provided with inwardly-projecting flanges, and a ratch located between the latter, of the follower and its stem, a helical spring encircling said stem, the cylindrical guide by which the latter is guided and the spring inclosed, vertical flanges formed on or attached to the said guide and adapted to interlock with the flanges on the post, the spring-catch arranged between such guide-flanges and adapted to engage the lower ratch, whereby the follower may be adjusted vertically or detached, as shown and described.

3. In a vegetable and fruit cutter, the combination, with the frame A, a cutter held therein, and a box B, adapted to reciprocate over the latter, of a spring-pressed follower, and a stop attached to the latter and adapted for detachable connection with the said box, as shown and described.

JAMES S. PATTEN.

Witnesses:
F. H. RITTER,
ED B. ROBERTS.